US012591666B2

(12) United States Patent
    Layouni

(10) Patent No.:     US 12,591,666 B2
(45) Date of Patent:        Mar. 31, 2026

(54) DETECTING MODEL INVERSION ATTACKS IN FEDERATED LEARNING

(71) Applicant: GM GLOBAL TECHNOLOGY OPERATIONS LLC, Detroit, MI (US)

(72) Inventor: Mohamed A. Layouni, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 18/626,431

(22) Filed: Apr. 4, 2024

(65) Prior Publication Data

US 2025/0315520 A1      Oct. 9, 2025

(51) Int. Cl.
    *G06F 21/55*          (2013.01)
(52) U.S. Cl.
    CPC .................................. *G06F 21/554* (2013.01)
(58) Field of Classification Search
    None
    See application file for complete search history.

(56)                    References Cited

U.S. PATENT DOCUMENTS

| | | | |
|---|---|---|---|
| 2017/0206464 A1* | 7/2017 | Clayton | .............. G06N 3/0475 |
| 2022/0019663 A1* | 1/2022 | Stapleton | ............. G06F 21/554 |
| 2024/0220847 A1* | 7/2024 | Mishra | ............... G06F 11/3452 |

* cited by examiner

*Primary Examiner* — William J. Goodchild
(74) *Attorney, Agent, or Firm* — CANTOR COLBURN LLP

(57)                      ABSTRACT

Examples described herein provide a method that includes receiving, by a processing system from a coordinating server, an initial machine learning model to be trained by the processing system using data associated with the processing system to generate a trained local machine learning model, the trained local machine learning model being one of a plurality of local machine learning models that the coordinating server uses to generate a global machine learning model using federated learning. The method further includes analyzing, by the processing system, the initial machine learning model to determine whether the initial machine learning model is a compromised model prior to training the initial machine learning model. The method further includes, responsive to determining that the initial machine learning model is a compromised model, implementing a corrective action to prevent training the initial machine learning model using the compromised model.

17 Claims, 5 Drawing Sheets

400

402

404

406        NO

YES

408

410

412

DETECTING MODEL INVERSION ATTACKS IN FEDERATED LEARNING

The subject disclosure relates to vehicles, and in particular to detecting model inversion attacks.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used to make predictions, perform classifications, and/or the like, for example. Machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs.

Federated learning is a type of machine learning in which multiple entities train a model together. In federated learning, data remains at the individual entities, thereby creating a decentralized architecture for training. This approach can improve data protection and reduce data privacy concerns because the data are not sent to a centralized entity for training.

SUMMARY

In one embodiment, a method is provided. The method includes receiving, by a processing system from a coordinating server, an initial machine learning model to be trained by the processing system using data associated with the processing system to generate a trained local machine learning model, the trained local machine learning model being one of a plurality of local machine learning models that the coordinating server uses to generate a global machine learning model using federated learning. The method further includes analyzing, by the processing system, the initial machine learning model to determine whether the initial machine learning model is a compromised model prior to training the initial machine learning model. The method further includes, responsive to determining that the initial machine learning model is a compromised model, implementing a corrective action to prevent training the initial machine learning model using the compromised model.

In addition to one or more of the features described herein, or as an alternative, further embodiments of the method may include: responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

In addition to one or more of the features described herein, or as an alternative, further embodiments of the method may include that analyzing the initial machine learning model includes: for each data item in a training batch, computing a gradient of a cost function at the data item with respect to a parameter; responsive to the gradient being non-zero, incrementing a counter; and comparing the counter to a threshold to determine whether the counter satisfies a threshold.

In addition to one or more of the features described herein, or as an alternative, further embodiments of the method may include that analyzing the initial machine learning model further includes, responsive to the counter satisfying the threshold, determining that the initial machine learning model is a compromised model.

In addition to one or more of the features described herein, or as an alternative, further embodiments of the method may include that analyzing the initial machine learning model further includes, responsive to the counter failing to satisfy the threshold, determining that the initial machine learning model is not a compromised model.

In addition to one or more of the features described herein, or as an alternative, further embodiments of the method may include: responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

In addition to one or more of the features described herein, or as an alternative, further embodiments of the method may include that the processing system is associated with a vehicle, and wherein the data associated with the processing system is data associated with the vehicle.

In another embodiment, a vehicle is provided. The vehicle includes a processing system having a memory storing computer readable instructions and a processing device for executing the computer readable instructions, the computer readable instructions controlling the processing device to perform operations. The operations include receiving, by the processing system from a coordinating server, an initial machine learning model to be trained by the processing system at the vehicle using data associated with the vehicle to generate a trained local machine learning model, the trained local machine learning model being one of a plurality of local machine learning models that the coordinating server uses to generate a global machine learning model using federated learning. The operations further include analyzing, by the processing system, the initial machine learning model to determine whether the initial machine learning model is a compromised model prior to training the initial machine learning model. The operations further include, responsive to determining that the initial machine learning model is a compromised model, implementing a corrective action to prevent training the initial machine learning model using the compromised model.

In addition to one or more of the features described herein, or as an alternative, further embodiments of the vehicle may include that the operations include: responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

In addition to one or more of the features described herein, or as an alternative, further embodiments of the vehicle may include that analyzing the initial machine learning model includes: for each data item in a training batch, computing a gradient of a cost function at the data item with respect to a parameter; responsive to the gradient being non-zero, incrementing a counter; and comparing the counter to a threshold to determine whether the counter satisfies a threshold.

In addition to one or more of the features described herein, or as an alternative, further embodiments of the vehicle may include that analyzing the initial machine learning model further includes, responsive to the counter satisfying the threshold, determining that the initial machine learning model is a compromised model.

In addition to one or more of the features described herein, or as an alternative, further embodiments of the vehicle may include that analyzing the initial machine learning model further includes, responsive to the counter failing to satisfy the threshold, determining that the initial machine learning model is not a compromised model.

In addition to one or more of the features described herein, or as an alternative, further embodiments of the vehicle may include that the operations include: responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

In another embodiment, a computer program product is provided. The computer program product includes a computer readable storage medium having program instructions embodied therewith, the program instructions executable by at least one processor to cause the at least one processor to perform operations. The operations include receiving, from a coordinating server, an initial machine learning model to be trained by the at least one processor using data associated with the at least one processor to generate a trained local machine learning model, the trained local machine learning model being one of a plurality of local machine learning models that the coordinating server uses to generate a global machine learning model using federated learning. The operations further include analyzing the initial machine learning model to determine whether the initial machine learning model is a compromised model prior to training the initial machine learning model. The operations further include, responsive to determining that the initial machine learning model is a compromised model, implementing a corrective action to prevent training the initial machine learning model using the compromised model.

In addition to one or more of the features described herein, or as an alternative, further embodiments of the computer program product may include that the operations further include: responsive to determining that the initial machine learning model is not a compromised model, training, by the at least one processor, the initial machine learning model to generate the trained local machine learning model using data associated with the at least one processor; and transmitting a gradient associated with the trained local machine learning model to the coordinating server.

In addition to one or more of the features described herein, or as an alternative, further embodiments of the computer program product may include that analyzing the initial machine learning model includes: for each data item in a training batch, computing a gradient of a cost function at the data item with respect to a parameter; responsive to the gradient being non-zero, incrementing a counter; and comparing the counter to a threshold to determine whether the counter satisfies a threshold.

In addition to one or more of the features described herein, or as an alternative, further embodiments of the computer program product may include that analyzing the initial machine learning model further includes, responsive to the counter satisfying the threshold, determining that the initial machine learning model is a compromised model.

In addition to one or more of the features described herein, or as an alternative, further embodiments of the computer program product may include that analyzing the initial machine learning model further includes, responsive to the counter failing to satisfy the threshold, determining that the initial machine learning model is not a compromised model.

In addition to one or more of the features described herein, or as an alternative, further embodiments of the computer program product may include that the operations further include: responsive to determining that the initial machine learning model is not a compromised model, training, by the at least one processor, the initial machine learning model to generate the trained local machine learning model using data associated with the at least one processor; and transmitting a gradient associated with the trained local machine learning model to the coordinating server.

In addition to one or more of the features described herein, or as an alternative, further embodiments of the computer program product may include that the at least one processor is associated with a vehicle, and wherein the data associated with the at least one processor is data associated with the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
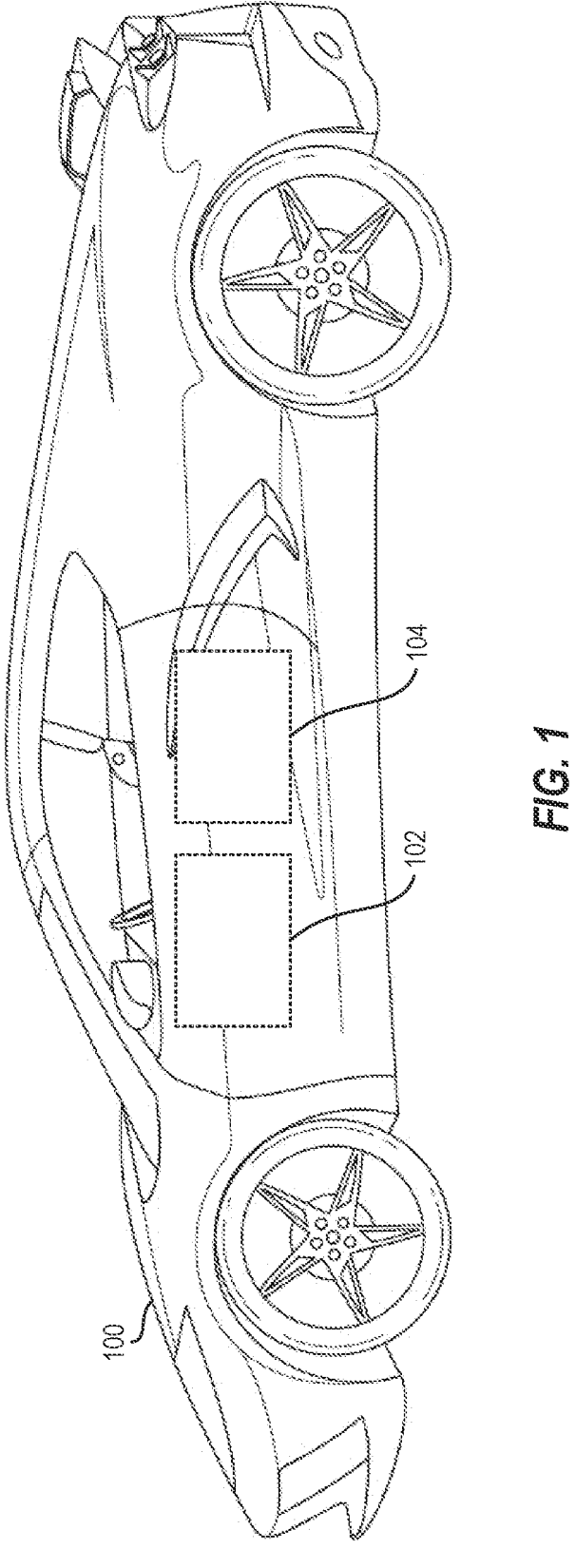
FIG. 1 is an illustration of a vehicle having a processing system for detecting model inversion attacks in federated learning according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

According to one or more embodiments, model inversion attacks in a federated learning environment can be detected and avoided.

Federated learning provides for training machine learning models on large sets of customer data without the data leaving the end users' devices. That is, a machine learning model can be trained without exchanging data among users and/or with a centralized entity for training. Federated learning significantly improves training machine learning models on large sets of customer data. In federated learning, models are locally-trained on end users' devices and are then combined by a coordinating server to derive a global model. Since the users' data is never sent explicitly to the coordinating server, federated learning can improve preserving privacy of user data. However, in some cases, the users' data can be compromised, such as if the coordinating server becomes corrupt. In such cases, the coordinating server can cause a locally-trained model to reveal parts of users' local training data. As a result, a user may not be willing to enable the user's device to participate in federated learning due to perceived risks of the user's data being compromised or exploited.

Data can be extracted in federated learning manipulating initial weights of an initial model that is sent to the user. The initial weights can be set to perform perfect extraction, which involves extracting a single data item used by the user's device to perform training. Alternatively, the initial weights can be set to perform extraction of a combination of data items used by the user's device to perform the training, for example a superposition of a few (e.g., 3, 5, 6, 8, etc.) images from the training data set. More particularly, initial weights of an initial model can be set in a way that causes the user's gradients in a first fully connected layer to be equal to zero for all data items in the user's training batch except for one data item (in the case of perfect extraction) or a few data items (in the case of extraction of a combination of data items).

More particularly, training in federated learning seeks to minimize a cost function C expressed as follows:

$$\text{Cost function } C = \|\text{Predicted Value} - \text{Ground} - \text{Truth}\| =$$

$$F(\text{Input Data, Current Weights \& Biases}) = F(\text{Input Data}, \theta_0, \ldots, \theta_M),$$

where $\theta$ are the vectors of model parameters (e.g., weights and biases) in the current machine learning model.

Processing systems that are distributed perform local training and send a resulting gradient to a coordinating server at each iteration of federated learning as follows:

$$\nabla C = Avg\left[\frac{\partial C}{\partial \theta_0}, \ldots, \frac{\partial C}{\partial \theta_M}\right],$$

where Avg is over local client data D.

A party seeking to implement an attack of the federated learning system can set initial model parameters $\theta_i$ such that:

$$Avg\left(\frac{\partial C}{\partial \theta_i}\right) = \frac{1}{N} \times \frac{\partial C(D_j)}{\partial \theta_i},$$
$$= Func(D_j)$$

for an element $D_j$ in the training batch D where "avg" refers to the average over the data items in the training batch D.

In this example, the function $Func(D_j)$ can be inverted, which allows for perfect extraction of the data item $D_j$ from the gradient. This attack can be performed on neural networks with fully connected first layers or on neural networks having a first layer that is a convolution layer and a second layer that is a fully connected layer.

One or more embodiments described herein address these and other shortcomings by analyzing an initial model received from a coordinating server that is performing federated learning. By analyzing the initial model, it can be determined whether the initial model is compromised, such as by a bad actor, and local training can be prevented or avoided where the initial model is a compromised model. Accordingly, user data is protected. That is, the user data is prevented from being exposed to the party who supplied the compromised model because the user's data is not used to train the compromised model. Further, the functioning of a processing system associated with the user is improved because the processing system can avoid wasting system resources (e.g., processing resources, memory resources, data storage resources, bandwidth, and/or the like, including combinations and/or multiples thereof) training a compromised model.

FIG. 1 is an illustration of a vehicle 100 having a processing system 102 for detecting model inversion attacks in federated learning according to one or more embodiments. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power.

The vehicle 100 includes the processing system 102 and sensors 104. The sensors 104 can collect information/data about the vehicle 100, such as navigation data, telemetry data, operating status data, and/or the like, including combinations and/or multiples thereof. For example, the sensors can collect data about the speed and direction of travel of the vehicle 100; whether the vehicle 100 is driving, parked, off, etc.; the state of various systems (e.g., collision avoidance systems, airbag systems, braking systems, infotainment systems, battery management systems, and/or the like, including combinations and/or multiples thereof) of the vehicle 100; and/or the like, including combinations and/or multiples thereof.

The processing system 102 can train a machine learning model using the data collected by the sensors 104 and/or other data associated with the vehicle, as is described herein. According to one or more embodiments, the processing system 102 is in communication with a coordinating server (e.g., the coordinating server 302 of FIG. 3) and is used to train a local machine learning model for federated learning. The processing system 102 can detect model inversion attacks in federated learning as described herein. For example, the processing system 102 can analyze an initial machine learning model received from the coordinating server and determine whether the initial machine learning model is compromised before training a local model using the initial machine learning model and the data collected by the sensors 104 and/or other data about the vehicle 100.

Figure 2:
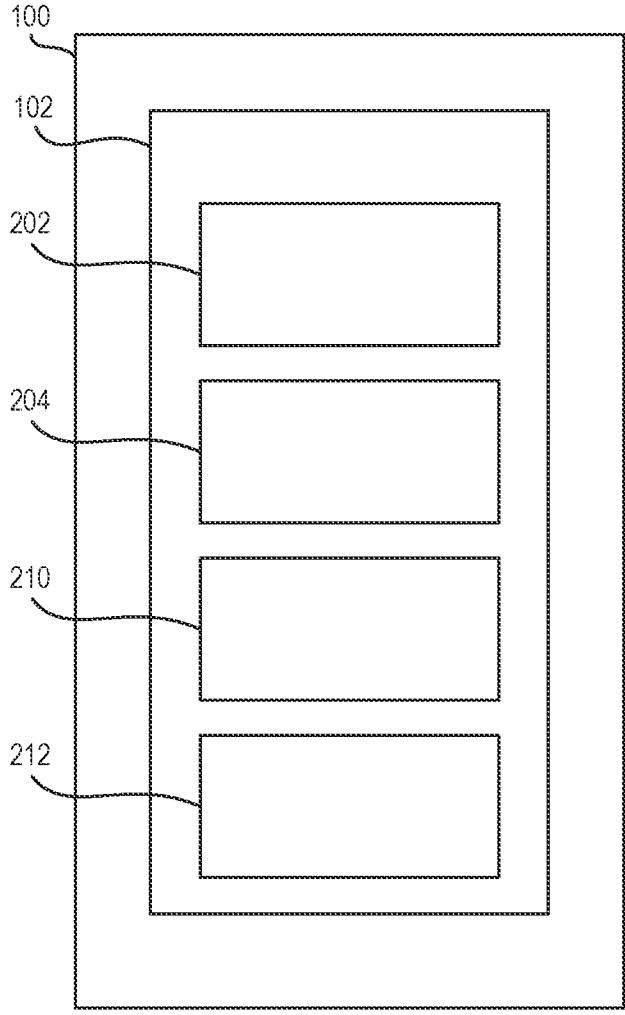
FIG. 2 is a block diagram of the processing system of FIG. 1 for detecting model inversion attacks in federated learning according to one or more embodiments.

FIG. 2 is a block diagram of the processing system 102 of FIG. 1 for detecting model inversion attacks in federated learning according to one or more embodiments. The processing system 102 includes a processing device 202, a memory 204, a model analysis engine 210, and a model training engine 212. It should be appreciated that the processing system 102 can be any device suitable for participating in federated learning. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof.

The processing device 202 is any suitable processing circuitry for processing data and/or instructions. The processing device 202 is an example of one or more of the processing devices 521 of FIG. 5, as described in more detail herein.

The memory 204 is any suitable device for storing data and/or instructions. The memory 204 is an example of one or more of the system memory 522, the random access memory 523, and/or the read-only memory 524 of FIG. 5, as described in more detail herein.

The model analysis engine 210 analyses an initial machine learning model received from a coordinating server (or another suitable source) and determines whether the initial machine learning model is a compromised model, as described in more detail herein.

The model training engine 212 trains a local model based on the initial machine learning model and data associated with the processing system 102. According to one or more embodiments described herein, the training occurs responsive to determining that the initial machine learning model is not a compromised model.

Figure 3:
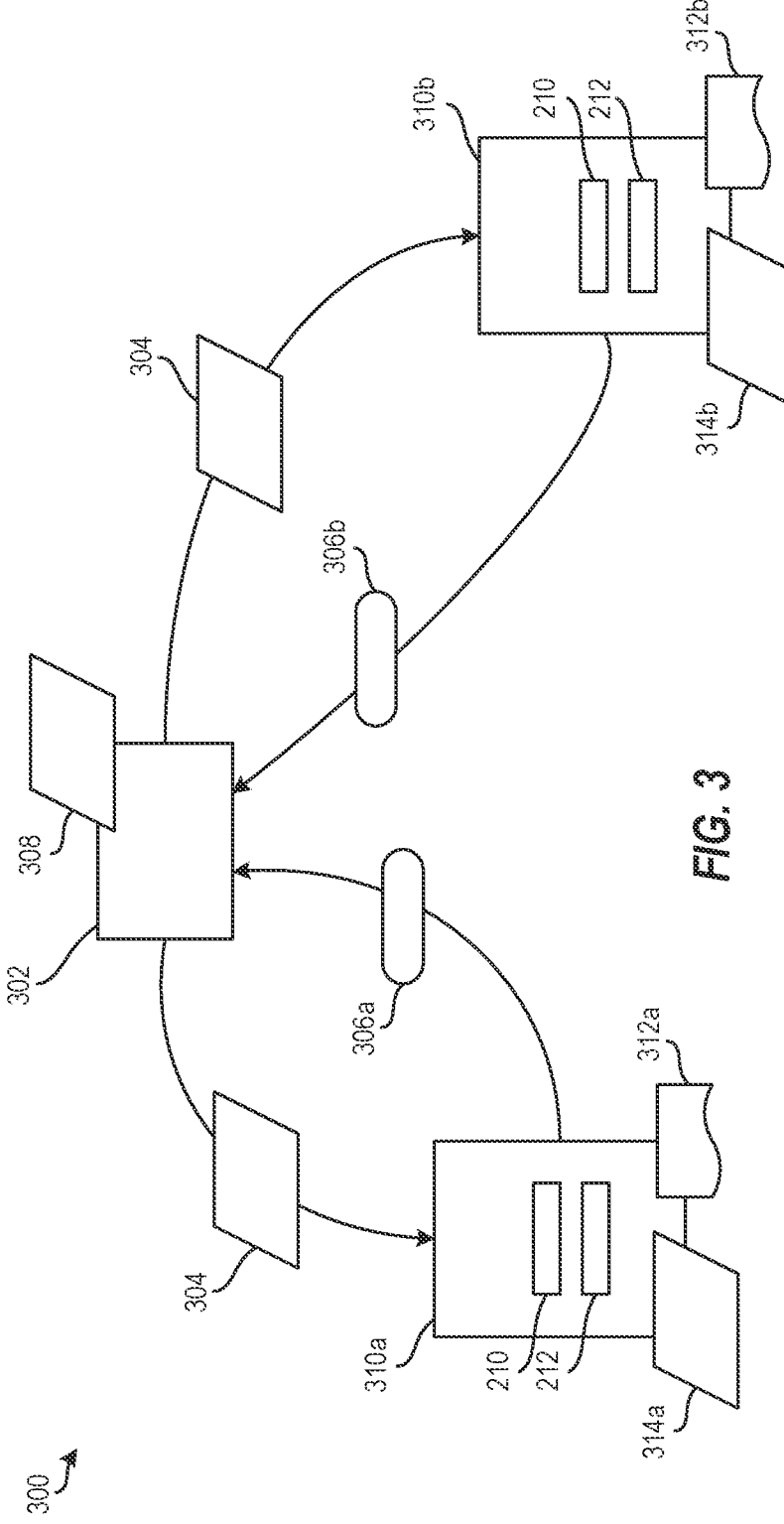
FIG. 3 is an environment for detecting model inversion attacks in federated learning according to one or more embodiments.
Figure 4:
FIG. 4 is a flow diagram of a method for detecting model inversion attacks in federated learning according to one or more embodiments.

Further aspects and features of the model analysis engine 210 and the model training engine 212 are described herein with respect to FIGS. 3 and 4.

The various components, modules, engines, etc. described regarding FIG. 2 (e.g., the model analysis engine 210, the model training engine 212) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus, a system memory (e.g., memory 204) can store program instructions that when executed by the processing device 202 implement the engines described herein. Other engines can also be utilized to include other features and functionality described in other examples herein.

FIG. 3 is an environment 300 for federated learning according to one or more embodiments. The environment 300 includes a coordinating server 302 and multiple processing systems 310a, 310b. Although two processing systems 310a, 310b are shown, it should be appreciated that additional processing systems can be included in the environment 300. It should be appreciated that each of the processing systems 310a includes the model analysis engine 210 and the model training engine 212 as shown in and described with respect to FIG. 2.

The coordinating server 302 uses federated learning to train a global model 308. To do this, the coordinating server 302 transmits an initial model 304 (e.g., an initial machine learning model) to the processing systems 310a, 310b. Each of the processing systems 310a, 310b use data 312a, 312b respectively to train local models 314a, 314b using the initial model 304. However, before training the local models 314a, 314b, each of the processing systems 310a, 310b uses the model analysis engine 210 to determine whether the initial model 304 is a compromised model. A compromised model is a model that is attempting to identify the data (e.g., the local data 314a) associated with the processing system (e.g., the processing system 310a) that is used to train the local machine learning model (e.g., the local model 314a). For example, a compromise model can be a model from an untrusted source or can be a model that is modified in an undesirable or nefarious manner without the knowledge of the coordinating server 302 (or an entity responsible for the coordinating server 302). The analysis of the initial model is further described herein with respect to FIG. 4.

Responsive to determining that the initial model 304 is a compromised model, the processing system 310a, 310b takes a corrective action, as described further herein. However, responsive to determining that the initial model 304 is not a compromised model, the processing system 310a, 310b can proceed with training the local model 314a, 314b. For example, the processing system 310a receives the initial model 304. The processing system 310a then analyzes the initial model 304 to determine whether the initial model 304 is a compromised model. If so, the processing system 310a implements a corrective action, such as to prevent training the local model 314a. If not, the processing system 310a proceeds to train, using the model training engine 212, the local model 314a using the data 312a and the initial model 304. It should be appreciated that the data 312a, 312b are specific to the respective processing systems 310a, 310b. According to one or more embodiments, if the processing system 310a, for example, is associated with a vehicle (e.g., the vehicle 100), the data 312a can be data about the vehicle (e.g., navigation information associated with the vehicle 100, an operating state (e.g., parked, driving, etc.) about the vehicle 100, telemetry data from the vehicle 100, and/or the like, including combinations and/or multiples thereof).

Once the local models 314a, 314b are trained, gradients 306a, 306b are sent from the respective processing systems 310a, 310b back to the coordinating server 302. The coordinating server 302 uses the gradients 306a, 306b to update the global model 308.

FIG. 4 is a flow diagram of a method 400 for detecting model inversion attacks in federated learning according to one or more embodiments. The method 400 can be implemented using any suitable system or device. For example, the method 400 can be implemented using the processing system 102 of FIGS. 1 and 2, by one or more of the devices 310a, 310b of FIG. 3, by the processing system 500 of FIG. 5, and/or the like, including combinations and/or multiples thereof. The method 400 is now described with reference to FIG. 3 but is not so limited.

At block 402, the processing system 310a receives from the coordinating server 302, an initial machine learning model (e.g., the model 304) to be trained by the processing system 310a. The processing system 310 uses data 312a associated with the processing system 310a to generate a trained local machine learning model 314a (also referred to simply as "local model"), the trained local machine learning model 314a being one of a plurality of local machine learning models (e.g., the local models 314a, 314b) that the coordinating server 302 uses to generate a global machine learning model 308 using federated learning. That is, each of the processing systems 310a, 310b can generate trained local machine learning models (e.g., the local models 314a, 314b) using respective data 312a, 312b. The coordinating server 302 uses the local machine learning models (e.g., the models 314a, 314b) from each of the processing system 310a, 310b (or information about the local machine learning models) to train a global machine learning model 308 (also referred to simply as "global model") using, for example, federated learning.

At block 404, the processing system 310a analyzes the initial machine learning model (e.g., the model 304) to determine whether the initial machine learning model is a compromised model prior to training the initial machine learning model. A compromised model is a model that is attempting to identify the data associated with the processing system that is used to train the local machine learning model. For example, a compromised model can be a model from an untrusted source or can be a model that is modified in an undesirable or nefarious manner without the knowledge of the coordinating server 302 (or an entity responsible for the coordinating server 302). According to one or more embodiments, the model 304 includes a first layer that is a fully connected layer—that is, an input into the model 304 is fed directly into a fully connected layer. According to one or more embodiments, the model 304 includes a first layer that is a convolution layer and a second layer that is a fully connected layer such that an input into the model 304 is fed into the convolution layer, and the output of the convolution layer is fed into a fully connected layer.

According to one or more embodiments, analyzing the initial machine learning model to determine whether the model is compromised includes the processing system 310a setting a counter to zero. For each data item d in a training batch D, the processing system 310a then computes a gradient of a cost function C at the data item d with respect to a parameter $\theta$ (e.g., weights vector). Responsive to the gradient being non-zero, the processing system 310a increments the counter. The processing system 310a then compares the counter to a threshold to determine whether the counter satisfies the threshold. According to one or more embodiments, the processing system analyses the initial machine learning model by checking each item d in the training batch D to determine whether the following condition is true:

$\exists\ d_0 \in D$, and j, such that $\nabla_{\theta_j} C(d)=0$ for all $d \in D$ except $d_0$ where $\theta_j$ is the vector of weights associated with the $j^{th}$ neuron in a first fully connected layer of the initial model 304.

According to one or more embodiments, the counter is said to satisfy the threshold if the counter is less than the threshold. According to one or more other embodiments, the counter is said to satisfy the threshold if the counter exceeds the threshold. The threshold can be set depending on whether it is desirable to detect models that are attempting perfect extraction or perform extraction of a combination of data items, for example a superposition of images. For perfect extraction, the threshold may be set to "1" while for extraction of super position of images, the threshold may be set higher than "1" (e.g., "3," "5," "6," and/or the like). The higher the threshold, the more sensitive the algorithm is to extraction attacks. For example, a threshold of "1" prevents perfect extraction but tolerates the extraction of a combination of "2" or more data items. A threshold of "2" does not allow for perfect extraction and is therefore considered stricter from a privacy point of view.

Example pseudocode for detecting perfect data extraction attacks by analyzing the initial machine learning model using a threshold of "1" is as follows:

```
For Weights Vector θ in parameters of a first fully connected layer:
    Counter Ctr = 0, Threshold = 1
    For              d in D:
                     Grad[θ,d]:=∇_θ C(d)
                     if Grad[θ,d] ≠0
                     Ctr++
    End For
    If Ctr == Threshold
                     Alert User about "Extraction Attack"
                     Break
End For.
```

Example pseudocode for detecting data extraction attacks by analyzing the initial machine learning model using an adjustable threshold is as follows:

```
For Weights Vector θ in parameters of a first fully connected layer:
    Counter Ctr = 0
    For              d in D:
                     Grad[θ,d]:=∇_θ C(d)
                     if Grad[θ,d] ≠0
                     Ctr++
    End For
    If Ctr ≤ Threshold
                     Alert User about "Extraction Attack"
                     Break
End For.
```

The adjustable threshold can be set greater than "1" in the case of the prior example so as to relax the condition to detect attacks where an adversary learns superposition of up to the threshold number of input images (e.g., 3). The adjustable threshold can be adjusted or fine-tuned for various use cases as desired, depending on the sensitivity of the data and/or the privacy preferences of a user. Generally, higher thresholds provide stronger privacy. However, setting the threshold too high may cause false detections. Accordingly, the adjustable threshold can be adjusted to achieve a desired balance of accuracy and privacy.

With continued reference to FIG. 4, at block 406, the processing system 310a determines whether the initial machine learning model (e.g., the initial model 304) is compromised. Particularly, if it is determined that the counter (from the analysis at block 404) satisfies the threshold, the processing system 310a determines that the initial machine learning model is a compromised model (block 406 "YES"), the method 400 proceeds to block 408. At block 408, the processing system 310a implements a corrective action to prevent training the initial machine learning model using the compromised model. Examples of corrective actions include generating an alert to a user (e.g., an operator of the vehicle 100) that a compromised model was detected, automatically preventing training the initial machine learning model using the compromised model, generating a fictitious gradient and transmitting the fictitious gradient back to the coordinating server 302, generating an alert to a party responsible for administering the coordinating server 302 (e.g., an administrative user of the coordinating server 302), and/or the like, including combinations and/or multiples thereof.

If, however, it is determined that the initial machine learning model is not a compromised model (block 406 "NO"), the method 400 proceeds to block 410. At block 410, the processing system 310a trains the initial model 304 to generate a trained local machine learning model (e.g., the local model 314a) using the data associated with the processing system 310a (e.g., the data 312a). At block 412, the processing system 310a transmits a gradient associated with the trained local machine learning model (e.g., the gradient 308*a*) to the coordinating server 302. The coordinating server 302 can then use the gradient 306*a*, along with gradients received from other processing systems (e.g., the gradient 306*b* received from the processing system 310*b*) to train the global model 308. The method 400 can then end or repeat as desired.

Additional processes also may be included, and it should be understood that the processes depicted in FIG. 4 represent illustrations, and that other processes may be added, or existing processes may be removed, modified, or rearranged without departing from the scope of the present disclosure. It should also be understood that the processes depicted in FIG. 4 may be implemented as programmatic instructions stored on a non-transitory computer-readable storage medium that, when executed by a processor (e.g., the processing device 202 of FIG. 2, the processor(s) 521 of FIG. 5, and/or the like, including combinations and/or multiples thereof) of a computing system (e.g., the processing system 102 of FIGS. 1 and 2, the processing system 500 of FIG. 5, and/or the like, including combinations and/or multiples thereof), cause the processor to perform the processes described herein.

Figure 5:
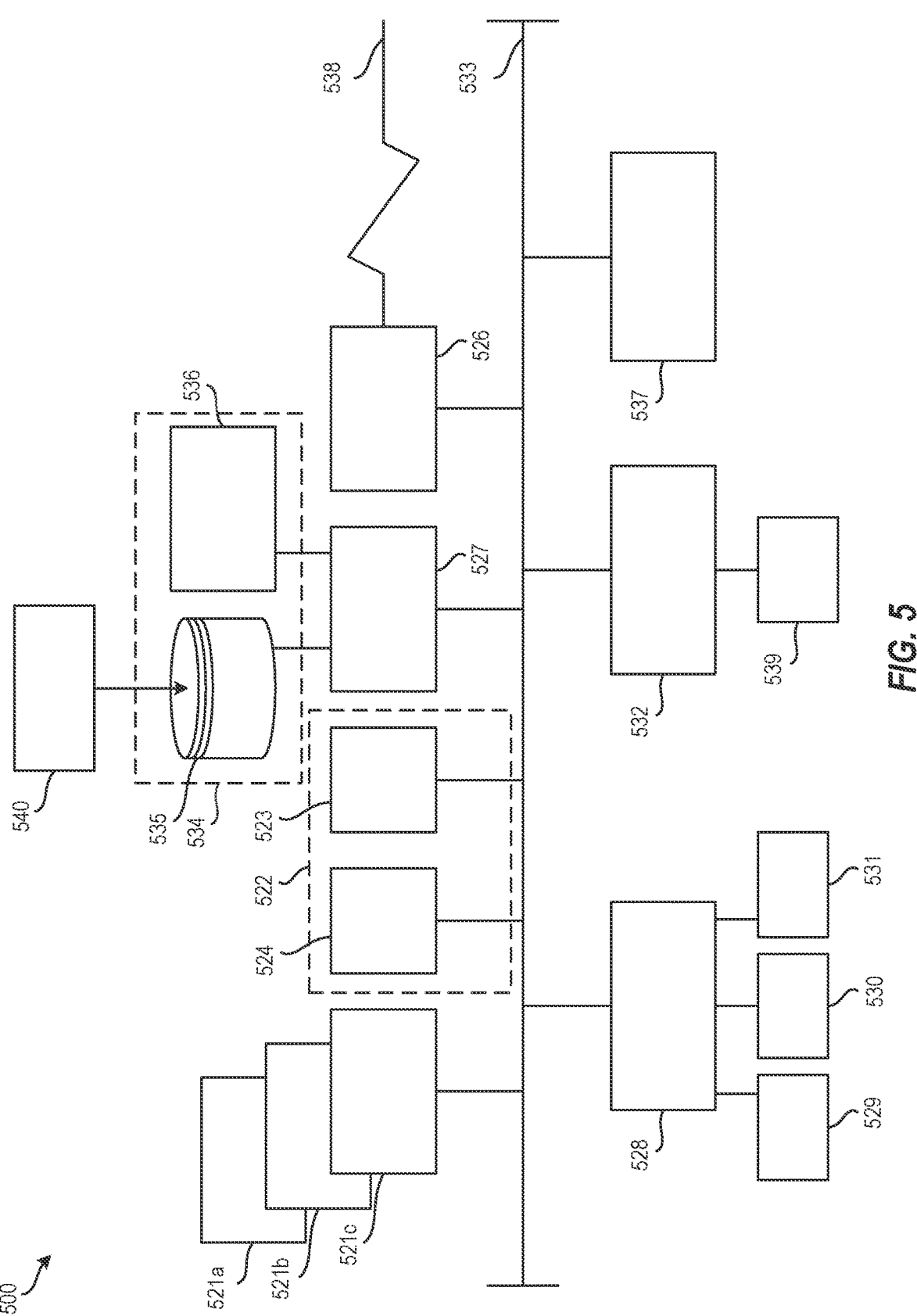
FIG. 5 is a block diagram of a processing system for implementing one or more embodiments described herein.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments described herein, the processing system 500 is an example of a cloud computing node of a cloud computing environment. In examples, processing system 500 has one or more central processing units (referred to also as "processors" or "processing resources" or "processing devices") 521*a*, 521*b*, 521*c*, etc. (collectively or generically referred to as processor(s) 521 and/or as processing device(s) 521). In aspects of the present disclosure, each processor 521 can include a reduced instruction set computer (RISC) microprocessor. Processors 521 are coupled to a system memory 522 and/or various other components via a system bus 533. The system memory 522 can include one or more temporary and/or persistent memory devices, such as a random access memory (RAM) 523, a read-only memory (ROM) 524, and/or the like, including combinations and/or multiples thereof. The system bus 533 may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 535 and/or a storage device 536 or any other similar component. I/O adapter 527, hard disk 535, and storage device 536 are collectively referred to herein as mass storage 534. Operating system 540 for execution on processing system 500 may be stored in mass storage 534. The network adapter 526 interconnects system bus 533 with an outside network 538 enabling processing system 500 to communicate with other such systems.

A display (e.g., a display monitor) 539 is connected to system bus 533 by display adapter 532, which may include a graphics adapter to improve the performance of graphics intensive applications and a video controller. In one aspect of the present disclosure, adapters 526, 527, and/or 532 may be connected to one or more I/O buses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via a user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit.

In some aspects of the present disclosure, processing system 500 includes a graphics processing unit (GPU) 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, processing system 500 includes processing capability in the form of processors 521, storage capability including the system memory 522 and mass storage 534, input means such as keyboard 525 and mouse 530, and output capability including speaker 531 and display 539. In some aspects of the present disclosure, a portion of system memory 522 and mass storage 534 collectively store the operating system 540 to coordinate the functions of the various components shown in processing system 500.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

13

What is claimed is:

1. A computer-implemented method comprising:

receiving, by a processing system from a coordinating server, an initial machine learning model to be trained by the processing system using data associated with the processing system to generate a trained local machine learning model, the trained local machine learning model being one of a plurality of local machine learning models that the coordinating server uses to generate a global machine learning model using federated learning;

analyzing, by the processing system, the initial machine learning model to determine whether the initial machine learning model is a compromised model prior to training the initial machine learning model;

responsive to determining that the initial machine learning model is a compromised model, implementing a corrective action to prevent training the initial machine learning model using the compromised model;

responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

2. The computer-implemented method of claim 1, wherein analyzing the initial machine learning model comprises:

for each data item in a training batch, computing a gradient of a cost function at the data item with respect to a parameter;

responsive to the gradient being non-zero, incrementing a counter; and comparing the counter to a threshold to determine whether the counter satisfies a threshold.

3. The computer-implemented method of claim 2, wherein analyzing the initial machine learning model further comprises, responsive to the counter satisfying the threshold, determining that the initial machine learning model is a compromised model.

4. The computer-implemented method of claim 3, wherein analyzing the initial machine learning model further comprises, responsive to the counter failing to satisfy the threshold, determining that the initial machine learning model is not a compromised model.

5. The computer-implemented method of claim 4, further comprising:

responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

6. The computer-implemented method of claim 1, wherein the processing system is associated with a vehicle, and wherein the data associated with the processing system is data associated with the vehicle.

7. A vehicle comprising:

a processing system, the processing system comprising:

a memory comprising computer readable instructions; and a processing device for executing the computer readable instructions, the computer readable instructions controlling the processing device to perform operations comprising:

receiving, by the processing system from a coordinating server, an initial machine learning model to be trained by the processing system at the vehicle using data associated with the vehicle to generate a trained local machine learning model, the trained local machine learning model being one of a plurality of local machine learning models that the coordinating server uses to generate a global machine learning model using federated learning;

analyzing, by the processing system, the initial machine learning model to determine whether the initial machine learning model is a compromised model prior to training the initial machine learning model;

responsive to determining that the initial machine learning model is a compromised model, implementing a corrective action to prevent training the initial machine learning model using the compromised model;

responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

8. The vehicle of claim 7, wherein analyzing the initial machine learning model comprises:

for each data item in a training batch, computing a gradient of a cost function at the data item with respect to a parameter;

responsive to the gradient being non-zero, incrementing a counter; and comparing the counter to a threshold to determine whether the counter satisfies a threshold.

9. The vehicle of claim 8, wherein analyzing the initial machine learning model further comprises, responsive to the counter satisfying the threshold, determining that the initial machine learning model is a compromised model.

10. The vehicle of claim 9, wherein analyzing the initial machine learning model further comprises, responsive to the counter failing to satisfy the threshold, determining that the initial machine learning model is not a compromised model.

11. The vehicle of claim 10, the operations further comprising:

responsive to determining that the initial machine learning model is not a compromised model, training, by the processing system, the initial machine learning model to generate the trained local machine learning model using data associated with the processing system; and transmitting a gradient associated with the trained local machine learning model to the coordinating server.

12. A computer program product comprising a computer readable storage medium having program instructions embodied therewith, the program instructions executable by at least one processor to cause the at least one processor to perform operations comprising:

receiving, from a coordinating server, an initial machine learning model to be trained by the at least one processor using data associated with the at least one processor to generate a trained local machine learning model, the trained local machine learning model being one of a plurality of local machine learning models that the coordinating server uses to generate a global machine learning model using federated learning;

analyzing the initial machine learning model to determine whether the initial machine learning model is a compromised model prior to training the initial machine learning model, wherein analyzing the initial machine learning model comprises:

for each data item in a training batch, computing a gradient of a cost function at the data item with respect to a parameter;

responsive to the gradient being non-zero, incrementing a counter; and comparing the counter to a threshold to determine whether the counter satisfies a threshold; and responsive to determining that the initial machine learning model is a compromised model, implementing a corrective action to prevent training the initial machine learning model using the compromised model.

13. The computer program product of claim 12, the operations further comprising:

responsive to determining that the initial machine learning model is not a compromised model, training, by the at least one processor, the initial machine learning model to generate the trained local machine learning model using data associated with the at least one processor; and transmitting a gradient associated with the trained local machine learning model to the coordinating server.

14. The computer program product of claim 13, wherein analyzing the initial machine learning model further comprises, responsive to the counter satisfying the threshold, determining that the initial machine learning model is a compromised model.

15. The computer program product of claim 14, wherein analyzing the initial machine learning model further comprises, responsive to the counter failing to satisfy the threshold, determining that the initial machine learning model is not a compromised model.

16. The computer program product of claim 15, the operations further comprising:

responsive to determining that the initial machine learning model is not a compromised model, training, by the at least one processor, the initial machine learning model to generate the trained local machine learning model using data associated with the at least one processor; and transmitting a gradient associated with the trained local machine learning model to the coordinating server.

17. The computer program product of claim 12, wherein at least one processor is associated with a vehicle, and wherein the data associated with the at least one processor is data associated with the vehicle.

* * * * *